No. 636,723. Patented Nov. 7, 1899.
J. W. GREGG.
EGG HOLDER AND ALARM.
(Application filed June 2, 1899.)
(No Model.)
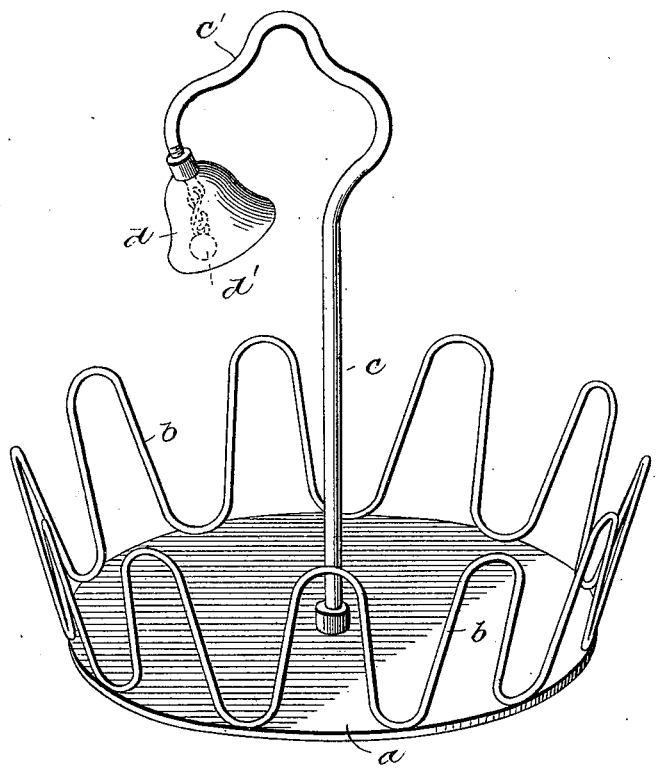
Witnesses
Inventor
Jas. W. Gregg.
by Wright, Brown & Quinby
Attorneys

UNITED STATES PATENT OFFICE.

JAMES W. GREGG, OF BRATTLEBOROUGH, VERMONT, ASSIGNOR OF ONE-HALF TO HERBERT O. EDGERTON AND DELANO D. DUNKLEE, OF GREENFIELD, MASSACHUSETTS.

EGG-HOLDER AND ALARM.

SPECIFICATION forming part of Letters Patent No. 636,723, dated November 7, 1899.

Application filed June 2, 1899. Serial No. 719,109. (No model.)

*To all whom it may concern:*

Be it known that I, JAMES W. GREGG, of Brattleborough, in the county of Windham and State of Vermont, have invented certain new and useful Improvements in Egg-Holders and Alarms, of which the following is a specification.

This invention has for its object to provide simple and effective means for notifying a cook when the water in which eggs are being cooked reaches the boiling-point; and to this end the invention consists in the improvements which I will now proceed to describe and claim.

The accompanying drawing, forming a part of this specification, represents a perspective view of an egg-holder and alarm embodying my invention.

In the drawing, $a$ represents a plate which is adapted to be inserted in a kettle or other vessel in which water can be boiled, the plate being formed so that it can be immersed in the water contained in the vessel and tilted or agitated by the ebullition of the water. In practice the plate is preferably a flat sheet-metal disk adapted to rest on the bottom of a kettle or pan, it being very desirable that the plate present a relatively large surface facing the bottom of the kettle and that its weight be reduced to the minimum in order that it may be freely agitated by the ebullition of the water in which it is immersed. The plate is provided with suitable means for confining the eggs to be cooked, a series of wire loops $b$ being here shown, although it is obvious that any other suitable confining device or wall adapted to permit a free circulation of boiling water over the plate and through the eggs thereon may be employed.

$c$ represents a standard affixed to the plate $a$ and projecting upwardly therefrom, its upper end carrying a signal device, preferably a bell $d$. When the water in which the plate $a$ is immersed reaches the boiling-point, its ebullition so agitates the plate as to oscillate the standard, and thus operate the signal device. The standard is preferably a wire rod, and its upper portion, to which the bell $d$ is connected, is preferably somewhat resilient to augment the motion of the bell when the standard is oscillated. The standard is here shown as provided with a curved portion or neck $c'$, to which the bell is attached, this neck being flexible, so that it may be bent, thus causing the bell to stand at any desired angle. One side of the body of the bell can thus be adjusted so as to stand at any desired distance from the tongue $d'$ of the bell when the latter is held in its normal position by gravity. When the bell is close to the tongue $d'$, the bell will be operated by a comparatively slight agitation of the plate $a$, and when the side of the bell is adjusted farther from the normal position of the tongue a more vibrant agitation will be required to ring the bell. It will be seen, therefore, that the device may be adjusted to ring immediately when the water reaches the boiling-point, or the ringing may be deferred until the water is in a more violent state of ebullition, thus providing for different degrees of cooking before the alarm is given.

I claim—

1. An egg-holder and alarm comprising a plate adapted to be inserted in a kettle and to be agitated by the ebullition of water therein, means for holding eggs on said plate, and a standard on the plate, supporting a signal device adapted to be operated by the agitation of said plate.

2. An egg-holder and alarm comprising a plate adapted to be inserted in a kettle and to be agitated by the ebullition of water therein, means for holding eggs on said plate, a standard on the plate, and a bell supported by said standard and adapted to be operated by the agitation of said plate.

3. An egg-holder and alarm comprising a plate adapted to be inserted in a kettle and to be agitated by the ebullition of water therein, means for holding eggs on said plate, a standard on the plate having a flexible neck, and a bell connected with said flexible neck and adapted to be adjusted thereby, said bell being adapted to be operated by the agitation of said plate.

In testimony whereof I have affixed my signature in presence of two witnesses.

JAMES W. GREGG.

Witnesses:
IDA V. FISHER,
ANNIE B. MCNALLY.